US009574538B2

(12) United States Patent
Sawada

(10) Patent No.: US 9,574,538 B2
(45) Date of Patent: Feb. 21, 2017

(54) IDLING STOP CONTROL SYSTEM FOR VEHICLE

(71) Applicant: FUJI JUKOGYO KABUSHIKI KAISHA, Tokyo (JP)

(72) Inventor: Shinji Sawada, Tokyo (JP)

(73) Assignee: FUJI KOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/668,693

(22) Filed: Mar. 25, 2015

(65) Prior Publication Data

US 2015/0275840 A1 Oct. 1, 2015

(30) Foreign Application Priority Data

Mar. 27, 2014 (JP) .................................. 2014-066642

(51) Int. Cl.
*F02N 11/08* (2006.01)

(52) U.S. Cl.
CPC ..... *F02N 11/0837* (2013.01); *F02N 2200/061* (2013.01); *F02N 2200/0801* (2013.01); *F02N 2200/0802* (2013.01); *F02N 2200/101* (2013.01); *F02N 2200/102* (2013.01); *F02N 2200/125* (2013.01); *Y02T 10/48* (2013.01)

(58) Field of Classification Search
CPC ............ F02N 11/0837; F02N 2200/102; F02N 2200/0801; F02N 2200/0802; F02N 2200/061; F02N 2200/101; F02N 2200/125; Y02T 10/48
USPC ... 123/179.4, 339.1, 339.14, 339.15; 701/36, 701/70, 96, 97, 112
See application file for complete search history.

(56) References Cited

U.S. PATENT DOCUMENTS

| 8,781,714 B2 * | 7/2014 | Kim ....................... B60K 28/10 123/179.3 |
| 2005/0103302 A1 * | 5/2005 | You ..................... F02N 11/0814 123/179.4 |
| 2005/0199209 A1 * | 9/2005 | Shimokawa ........ F02N 11/0822 123/179.4 |
| 2006/0142121 A1 * | 6/2006 | Moriya ............... F02N 11/0833 477/199 |
| 2006/0224279 A1 * | 10/2006 | Mori ................... F02N 11/0833 701/1 |
| 2008/0172170 A1 * | 7/2008 | Lecole ................ F02N 11/0822 701/113 |

(Continued)

FOREIGN PATENT DOCUMENTS

| JP | 11030138 A * | 2/1999 |
| JP | 2000-045819 A | 2/2000 |

(Continued)

*Primary Examiner* — Joseph Dallo
(74) *Attorney, Agent, or Firm* — McDermott Will & Emery LLP

(57) ABSTRACT

An idling stop control system stops an idling of an engine so as to automatically stop the engine in the case where a predetermined condition on automatic stop of the engine is established and releases the automatic stop of the engine so as to restart the engine in the case where a predetermined condition on restart of the engine is established in accordance with a driving condition of the vehicle. The idling stop control system recognizes a type of an object in front of the vehicle and restarts the engine depending on the type of the object in front of the vehicle even if the engine is in the automatic stop and the restart condition of the engine is not established with respect to the driving condition.

5 Claims, 3 Drawing Sheets

(56) References Cited

U.S. PATENT DOCUMENTS

| | | | | |
|---|---|---|---|---|
| 2009/0093925 A1* | 4/2009 | Gumbel | ................ | B60Q 1/486 |
| | | | | 701/36 |
| 2010/0106390 A1* | 4/2010 | Yamaguchi | ........... | B60W 10/08 |
| | | | | 701/102 |
| 2010/0250105 A1* | 9/2010 | Nagatsuyu | ............ | F02D 41/061 |
| | | | | 701/112 |
| 2011/0071001 A1* | 3/2011 | Yu | ......................... | B60K 6/485 |
| | | | | 477/203 |
| 2011/0095909 A1* | 4/2011 | Kushi | ..................... | G08G 1/161 |
| | | | | 340/905 |
| 2011/0102195 A1* | 5/2011 | Kushi | .............. | G08G 1/096716 |
| | | | | 340/905 |
| 2011/0112740 A1* | 5/2011 | Hashimoto | ............. | F02D 17/02 |
| | | | | 701/70 |
| 2012/0029730 A1* | 2/2012 | Nagura | ............... | F02N 11/0837 |
| | | | | 701/2 |
| 2012/0132176 A1* | 5/2012 | Sawada | ............... | F02N 11/0837 |
| | | | | 123/339.14 |

FOREIGN PATENT DOCUMENTS

| | | |
|---|---|---|
| JP | 2010-077994 A | 4/2010 |
| JP | 2012-116299 A | 6/2012 |

* cited by examiner

IDLING STOP CONTROL SYSTEM FOR VEHICLE

CROSS-REFERENCE TO RELATED APPLICATIONS

The present application claims priority from Japanese Patent Application No. 2014-066642 filed on Mar. 27, 2014, the entire contents of which are hereby incorporated by reference.

BACKGROUND

1. Technical Field

The present invention relates to an idling stop control system for a vehicle that automatically stops an idling of an engine in the case where an automatic stop condition of the engine is established and that automatically starts the engine in the case where an automatic start condition of the engine is established.

2. Related Art

Recently, in order to improve fuel economy and to decrease exhaust gas emission, various kinds of techniques concerning a function for stopping idling have been proposed and are in practical use. The function automatically stops an engine when operation of the engine is not required in a state such as while waiting for a traffic light to change, a train to pass, or a person to come, and then the function automatically starts the engine when operation of the engine is required. For example, Japanese Unexamined Patent Application Publication (JP-A) No. 2000-45819 discloses a technique of an idling control system for a vehicle, which calculates a relative speed of a preceding vehicle on the basis of a change of an inter-vehicle distance and a speed of the vehicle. The system determines whether the preceding vehicle stops or starts by checking on the calculated relative speed of the preceding vehicle and the speed of the vehicle provided with the system. When it is determined that the preceding vehicle stops and the vehicle also stops, a stop mode is automatically executed to stop the engine of the vehicle; and when it is determined that the preceding vehicle starts during the engine of the vehicle being in the stop mode, an idling start mode is automatically executed to restart the engine of the vehicle.

In the technique used in such as the idling control system disclosed in JP-A No. 2000-45819, the idling start mode is automatically executed to restart the engine when it is determined that the preceding vehicle starts to move (hereinafter, containing changes of an inter-vehicle distance and a speed) while the vehicle is at a stop under the stop mode. However, in the state the vehicle is under such a stop mode, if a pedestrian crosses a road, a bicycle moves, or a motorcycle slip through traffic in front of the vehicle, the idling control system may mistakenly determine, due to such moving objects, that the preceding vehicle starts to move. Thus, the stop mode is unnecessarily released, and as a result, the idling start mode may be repeatedly executed. Thus, if release of the stop mode is unnecessarily frequently executed, not only is it difficult to successfully improve fuel economy, but also the unnecessarily frequent ON/OFF of the engine may annoy the driver.

SUMMARY OF THE INVENTION

In view of the above problem, it is an object of the present invention to provide an idling stop control system for a vehicle that does not unnecessarily restart an engine but properly restarts the engine in response to a situation so as to sufficiently improve fuel economy and not annoy the driver by restarting the engine from the stop.

An aspect of the present invention provides an idling stop control system for a vehicle, which stops an idling of an engine so as to automatically stop the engine in the case where a predetermined condition on automatic stop of the engine is established and releases the automatic stop of the engine so as to restart the engine in the case where a predetermined condition on restart of the engine is established in accordance with a driving condition of the vehicle. The idling stop control system includes a front information recognition unit that recognizes a type of an object in front of the vehicle; and a second restart determination unit that determines the restart of the engine depending on the type of the object in front of the vehicle recognized by the front information recognition unit, even if the restart condition of the engine is not established during the automatic stop of the engine. The idling stop control system performs and prohibits the restart the engine in accordance with the determination made by the second restart determination unit.

BRIEF DESCRIPTION OF THE DRAWINGS

FIG. 3A is for the case in which the object is a pedestrian; and FIG. 3B is for the case in which the object is motorcycle.

DETAILED DESCRIPTION

Hereinafter, an implementation of the idling stop control system for a vehicle will be described with reference to the drawings.

Figure 1:
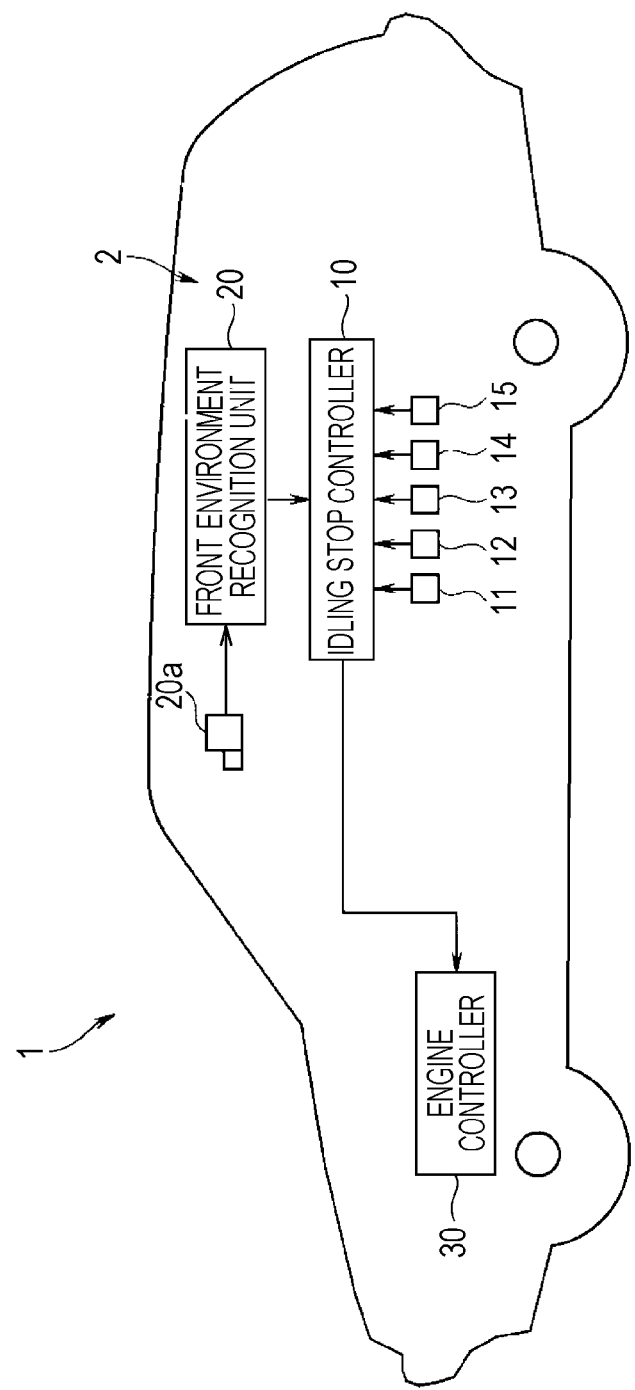
FIG. 1 is a schematic block diagram of an idling stop control system according to an implementation of the invention, the system being installed in a vehicle.

FIG. 1 illustrates a vehicle 1 provided with an idling stop control system 2 that automatically stops idling of an unillustrated engine and restarts the engine that is in the automatic stop.

Figure 2:
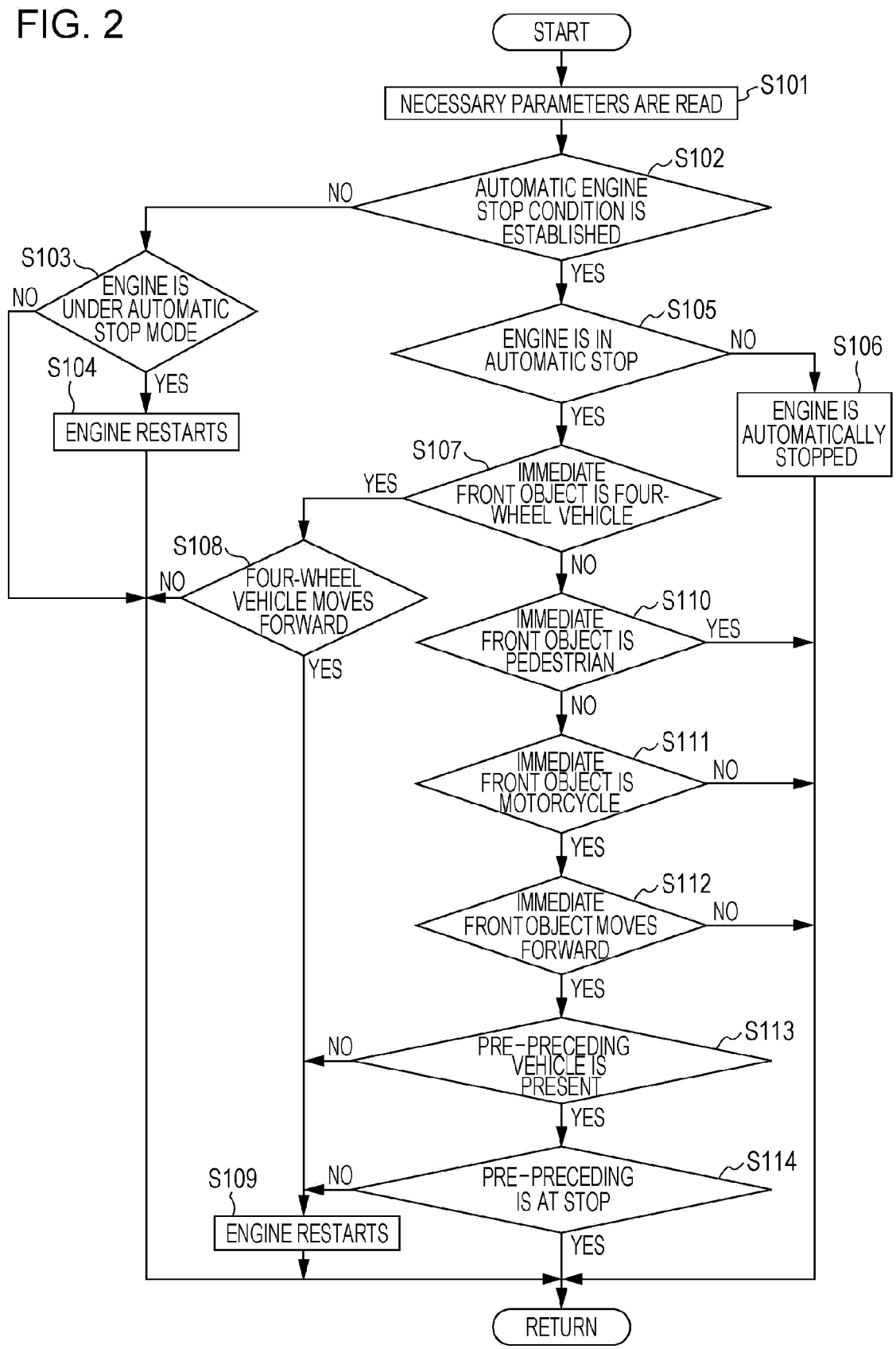
FIG. 2 is a flow chart of an idling stop control program according to the implementation of the invention.

In the idling stop control system 2, a front environment recognition unit 20 that obtains forward information of the vehicle on the basis of images captured by a stereo camera assembly 20a is connected to an idling stop controller 10 that executes an idling control program illustrated in FIG. 2, which is later described. An engine controller 30 is also connected to the idling stop controller 10.

The idling stop controller 10 receives signals from a vehicle speed sensor 11, a gear shift lever position sensor 12, a brake pedal depression sensor 13, an acceleration pedal depression sensor 14, a battery meter 15, and the like.

The stereo camera assembly 20a of the vehicle 1 includes a pair of cameras (right and left cameras). Each of the cameras uses a solid imaging device and the like that captures an image of the front environment of the vehicle 1. The cameras are attached to the front side of a ceiling of the vehicle compartment such that the cameras have a given baseline length therebetween. The stereo camera assembly 20a captures travelling environment in stereo from different viewpoints and output image data to the front environment recognition unit 20.

The front environment recognition unit 20 includes an image processing engine that processes at a high speed images captured by the stereo camera assembly 20a and serves as a processing unit that performs a recognition process in accordance with an output result of the image processing engine and travelling information on the vehicle 1 (for example, vehicle speed). The image processing of the stereo camera assembly 20a in the front environment recognition unit 20 is performed by, for example, the following processing.

Firstly, the front environment recognition unit 20 causes the stereo camera assembly 20a to capture a pair of stereo images of an area in front of the vehicle 1 in the travelling direction and obtains distance information from deviations for a same point in the pair of images to generate a distance image. Secondly, a well-known grouping processing is performed on the obtained distance image. In this processing, the distance image is compared with previously stored frames (windows) for three-dimensional road shape data, sidewall data, and three-dimensional object data so as to extract lane line data and side wall data such as a crash barrier and a curbstone extending along the road. In addition, objects are classified into a pedestrian, a motorcycle, a four-wheel vehicle, and another object. Among captured objects, an object nearest to the vehicle 1 is extracted as an immediate front object and a four-wheel vehicle immediately in front of the immediate front object is identified as a pre-preceding vehicle (of the vehicle 1). These data items are processed under a coordinate system in which an origin point is the position of the vehicle 1, an X-axis extends in the travelling direction of the vehicle 1, and a Y-axis extends in the width direction of the vehicle 1. The lane line data, the crash barrier data such as a guardrail and a curbstone extending along the road, data on of an object such as a type, the distance from the vehicle 1, the center position, and the speed are supplied to the idling stop controller 10 as front three-dimensional object information.

In an implementation of the invention, the stereo camera assembly 20a is used as an example of the recognition sensors. Alternatively, other recognition sensors such as a monocular camera, a millimeter wave radar, and an inter-vehicle communication system, may be used. The stereo camera assembly 20a and the front environment recognition unit 20 serve as the front information recognition unit of the present invention in the implementation.

Upon receiving a signal from the idling stop controller 10, the engine controller 30 performs idling stop control based on the above input signal to perform automatic stop of the idling of the engine and automatic restart of the engine in the automatic stop.

Next, the idling stop control performed in the idling stop control system 10 will be described in accordance with the flow chart illustrated in FIG. 2.

Firstly, in step (hereinafter, referred to "S") 101, parameters that are necessary for the idling stop control are read. The parameters include; information on an object in front of the vehicle (type, presence/absence of a pre-preceding vehicle, distance, speed, and the like) that is detected by the front environment recognition unit 20, information on the vehicle speed of the vehicle 1 obtained from the vehicle speed sensor 11; information on a gear shift lever position ([P], [N], [R], [D], [3rd], [2nd], [1st]) obtained from the gear shift lever position sensor 12; information on a brake pedal depression amount obtained from the brake pedal depression sensor 13; information on an acceleration pedal depression amount obtained from the acceleration pedal depression sensor 14; information on a battery residual capacity from the battery meter 15, and the like.

Next, the flow advances to S102 to determine whether or not a predetermined condition for automatic stop is established. The condition for automatic stop in the implementation must satisfy all of conditions items; the brake pedal being depressed; the acceleration pedal not being depressed; the gear shift lever position being set to be any one of positions [P], [N], [D], [3rd], [2nd], and [1st]; the vehicle speed being about zero (0); and the battery residual capacity being sufficient.

Note that, the case where the above automatic stop condition is not established is a condition for restarting the engine based on a predetermined driving state of the vehicle 1.

In the case where the automatic stop condition in S102 is not established, that is, the restart condition of the engine is established, the flow advances to S103 to determine whether or not the engine is in the automatic stop. If the engine is in the automatic stop, the flow advances to S104 where a signal for restart of the engine is output to the engine controller 30. Then, the flow exits the routine.

In the case where the engine is determined in S103 not to be in the automatic stop (the engine is idling), the flow exits the routine without any change, that is, with the engine keeping idling.

On the other hand, in the case where it is determined in S102 that the engine automatic stop condition is established, the flow advances to S105 to determine whether or not the engine is in the automatic stop.

If the engine is determined in S105 not to be in the automatic stop, that is, the engine is idling), the flow advances to S106 where a signal for automatic stop of the engine is output to the engine controller 30. Then, the flow exits the routine.

If the engine is determined in S105 to be in the automatic stop, the flow advances to S107 to determine whether or not the object immediately in front of the vehicle 1 which is recognized by the front environment recognition unit 20 is a four-wheel vehicle.

If the object immediately in front of the vehicle 1 recognized by the front environment recognition unit 20 is determined in S107 to be a four-wheel vehicle, the flow advances to S108 to determine whether or not the four-wheel vehicle moves (including a change of a speed and an inter-vehicle distance). If the four-wheel vehicle moves, the flow advances to S109 to output a signal for restart of the engine is to the engine controller 30. Then, the flow exits the routine. If the four-wheel vehicle does not move, the flow exits the routine without any change, that is, with the engine keeping idling).

Figure 3A:
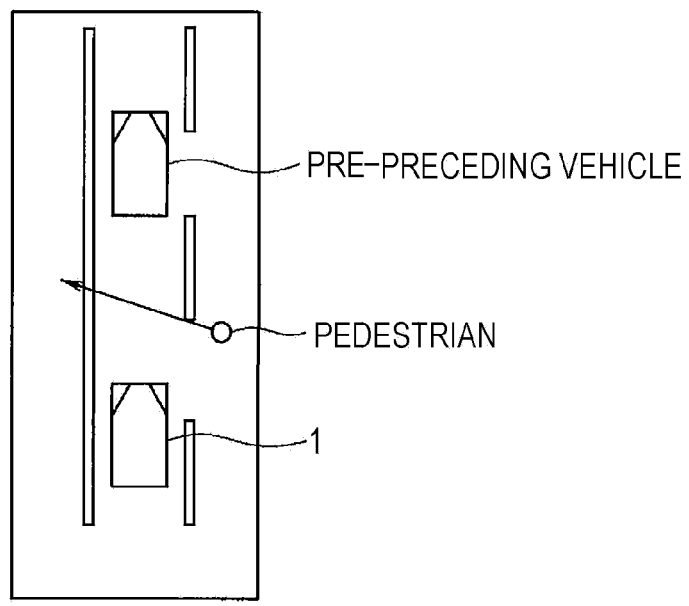
FIGS. 3A and 3B describe the restart of the engine according to the implementation, which is adjusted according to an object immediately in front of the vehicle.

If the object immediately in front of the vehicle 1 recognized by the front environment recognition unit 20 is determined in S107 not to be a four-wheel vehicle, the flow advances to S110 to determine whether or not the object immediately in front of the vehicle 1 recognized by the front environment recognition unit 20 is a pedestrian. If the object immediately in front of the vehicle 1 is determined to a pedestrian, the flow exits the routine without any change, that is, with the engine kept in the automatic stop). That is, if the object immediately in front of the vehicle 1 is a pedestrian, it is not necessary to restart the engine in haste and, as a result, it is possible to perform control in such a manner that the pedestrian does not feel unsafe (see FIG. 3A).

If the object immediately in front of the vehicle 1 is determined in S110 not to be a pedestrian, the flow advances to S111 to determine whether or not the object immediately in front of the vehicle 1 recognized by the front environment recognition unit 20 is a motorcycle.

If the object immediately in front of the vehicle 1 is determined in S111 not to be a motorcycle, the flow exits the routine without any change, that is, with the engine kept in the automatic stop. On the other hand, if the object immediately in front of the vehicle 1 is determined to be a motorcycle, the flow advances to S112 to determine whether or not the object (the motorcycle) moves (including a change of a speed and an inter-vehicle distance).

If the object (the motorcycle) immediately in front of the vehicle 1 is determined in S112 not to move, the flow exits the routine without any change, that is, with the engine kept in the automatic stop. If the object (the motorcycle) immediately in front of the vehicle 1 moves, the flow advances to S113 to determine whether or not there is a four-wheel vehicle (a pre-preceding vehicle of the vehicle 1) in front of the object (the motorcycle) immediately in front of the vehicle 1.

If it is determined in S113 that there is no pre-preceding vehicle of the vehicle 1, the flow advances to S109 to output a signal for restart of the engine to the engine controller 30. Then, the flow exits the routine. That is, since the motorcycle immediately in front of the vehicle 1 moves forward and there is no pre-preceding vehicle of the vehicle 1, it is determined that the automatic stop is highly likely to be released.

If it is determined in 113 that there is a pre-preceding vehicle of the vehicle 1, the flow advances to S114 to determine whether or not the pre-preceding vehicle is at a stop.

Figure 3B:
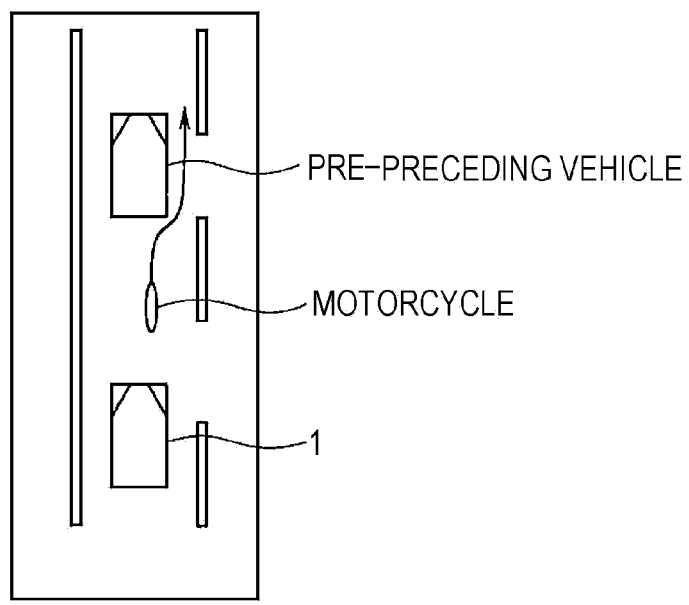

If the pre-preceding vehicle is determined in S114 to be at a stop, the flow exits the routine (see FIG. 3B) without any change, that is, with the engine kept in the automatic stop. On the other hand, if the pre-preceding vehicle is determined to move, the flow advances to S109 to output a signal for restart of the engine to the engine controller 30. Then the flow exits the routine. If the motorcycle immediately in front of the vehicle 1 moves forward, but the pre-preceding vehicle is at a stop, the motorcycle is highly likely to pass by the pre-preceding vehicle. Consequently, if the engine is restarted in response to such movement of the motorcycle, unnecessary restart of the engine is performed, whereby not only improvement in fuel economy is not fully achieved, but also the ON/OFF actions of the engine will annoy the driver. The implementation of the invention can effectively prevent such problems. Accordingly, the idling controller 10 also serves the second restart determination unit of the present invention in the implementation.

According to the implementation of the invention, in the case where the predetermined automatic stop condition is established, the idling of the engine is stopped and thus the engine is automatically stopped. On the other hand, in the case where the engine restart condition is established in accordance with the predetermined vehicle driving condition, the automatic stop is released and the engine is restarted.

In the implementation, the type of an object in front of the vehicle is identified, and even if the restarting condition of the engine is not established in accordance with the driving condition of the vehicle during the automatic stop, the engine is restarted depending on the type of the object in front of the vehicle 1. In the case where the object immediately in front of the vehicle 1 is a four-wheel vehicle, the engine of the vehicle 1 is basically restarted when the four-wheel vehicle moves. In the case where the object is a pedestrian, the restart of the engine is prohibited. In the case where the object immediately in front of the vehicle is a motorcycle and another vehicle in front of the motorcycle is at a stop, the restart of the engine of the vehicle 1 is prohibited even if the motorcycle moves. Thus, when the engine is restarted from the stop of idling, the engine is not unnecessarily restarted but properly restarted depending on a situation, thereby sufficiently improving fuel economy and eliminating the possibility that the driver will be annoyed.

The invention claimed is:

1. An idling stop control system for a vehicle, which stops an idling of an engine of the vehicle so as to automatically stop the engine in the case where a predetermined condition on automatic stop of the engine is established, and releases the automatic stop of the engine so as to restart the engine in the case where a predetermined condition on restart of the engine is established in accordance with a driving condition of the vehicle, the idling stop control system comprising:
   a front information recognition unit that recognizes an object in front of the vehicle and assigning one of a plurality of predetermined types to the object; and
   a restart determination unit that determines the restart of the engine depending on the assigned type of the object in front of the vehicle, even if the restart condition of the engine is not established during the automatic stop of the engine, wherein:
   in response to a determination that the assigned type of the object is a first predetermined type of the plurality of predetermined types and the front information recognition unit detects a position change of the object, the idling stop control system performs the restart of the engine,
   in response to a determination that the assigned type of the object is one of the plurality of predetermined types not including the first predetermined type, the idling stop control system prohibits the restart of the engine, and
   in response to a determination that the assigned type of the object immediately in front of the vehicle is a motorcycle and the front information recognition unit recognizes that another vehicle in front of the motorcycle and in the same lane as the vehicle is at a stop, the restart determination unit determines to prohibit the restart of the engine even if the motorcycle moves.

2. The idling stop control system for a vehicle according to claim 1, wherein, in response to a determination that the assigned type of the object immediately in front of the vehicle is a pedestrian, the restart determination unit determines to prohibit the restart of the engine.

3. The idling stop control system for a vehicle according to claim 1, wherein in response to a determination that the assigned type of the object in front of the vehicle is a four-wheel vehicle, the restart determination unit determines to release automatic stop of the engine to restart the engine when the four-wheel vehicle moves.

4. The idling stop control system for a vehicle according to claim 2, wherein, in response to a determination that the assigned type of the object in front of the vehicle is a four-wheel vehicle rather than a pedestrian, the restart determination unit determines to release automatic stop of the engine to restart the engine when the four-wheel vehicle moves.

5. An idling stop control system for a vehicle, which stops an idling of an engine of the vehicle so as to automatically stop the engine in the case where a predetermined condition on automatic stop of the engine is established, and releases the automatic stop of the engine so as to restart the engine in the case where a predetermined condition on restart of the engine is established in accordance with a driving condition of the vehicle, the idling stop control system comprising:

a front information recognition unit that recognizes an object in front of the vehicle and assigning one of a plurality of predetermined types to the object; and a restart determination unit that determines the restart of the engine depending on the assigned type of the object in front of the vehicle and, even if the restart condition of the engine is not established during the automatic stop of the engine, wherein:

in response to a determination that the assigned type of the object immediately in front of the vehicle is other than a four-wheel vehicle and when the front information recognition unit recognizes a pre-preceding vehicle existing in front of the object on the same lane as the vehicle is at a stop, the restart determination unit determines to prohibit the restart of the engine.

* * * * *